(12) United States Patent  (10) Patent No.: US 8,146,948 B2
Burns  (45) Date of Patent: Apr. 3, 2012

(54) STRUCTURAL AIR TANK CROSSMEMBER

(75) Inventor: Stephen Francis Burns, Huntertown, IN (US)

(73) Assignee: International Truck Intellectual Property Company, LLC, Lisle, IL (US)

( * ) Notice: Subject to any disclaimer, the term of this patent is extended or adjusted under 35 U.S.C. 154(b) by 433 days.

(21) Appl. No.: 12/490,581

(22) Filed: Jun. 24, 2009

(65) Prior Publication Data

US 2010/0327573 A1 Dec. 30, 2010

(51) Int. Cl.
B60G 1/00 (2006.01)
(52) U.S. Cl. .. 280/831; 280/781; 280/782; 280/124.157
(58) Field of Classification Search ................. 280/831, 280/781, 782, 783, 124.157; 220/562
See application file for complete search history.

(56) References Cited

U.S. PATENT DOCUMENTS

| | | | | |
|---|---|---|---|---|
| 1,198,885 A * | 9/1916 | Billinghurst | ............ | 280/124.163 |
| 3,880,445 A * | 4/1975 | Chieger | ......................... | 280/783 |
| 4,087,101 A * | 5/1978 | Shimazaki et al. | ............ | 280/834 |
| 6,398,236 B1 * | 6/2002 | Richardson | .................. | 280/86.5 |
| 6,668,957 B2 * | 12/2003 | King | ............................. | 180/68.5 |
| 7,243,949 B2 * | 7/2007 | Valdez et al. | .................. | 280/782 |
| 7,503,586 B2 * | 3/2009 | Ramsey | ......................... | 280/783 |
| 2005/0062251 A1 * | 3/2005 | Ramsey | ................. | 280/124.153 |

* cited by examiner

Primary Examiner — Joanne Silbermann
Assistant Examiner — Michael Stabley
(74) Attorney, Agent, or Firm — Jeffrey P. Calfa; Mark C. Bach

(57) ABSTRACT

A motor vehicle frame having parallel frame rails and at least one cross member constructed from a tube. The tube is sealed at its opposite ends by first and second mounting plates to provide a sealed, closed space for the storage of fluids. The mounting plates directly abut the frame rails for attachment of the cross member to the vehicle frame.

3 Claims, 5 Drawing Sheets

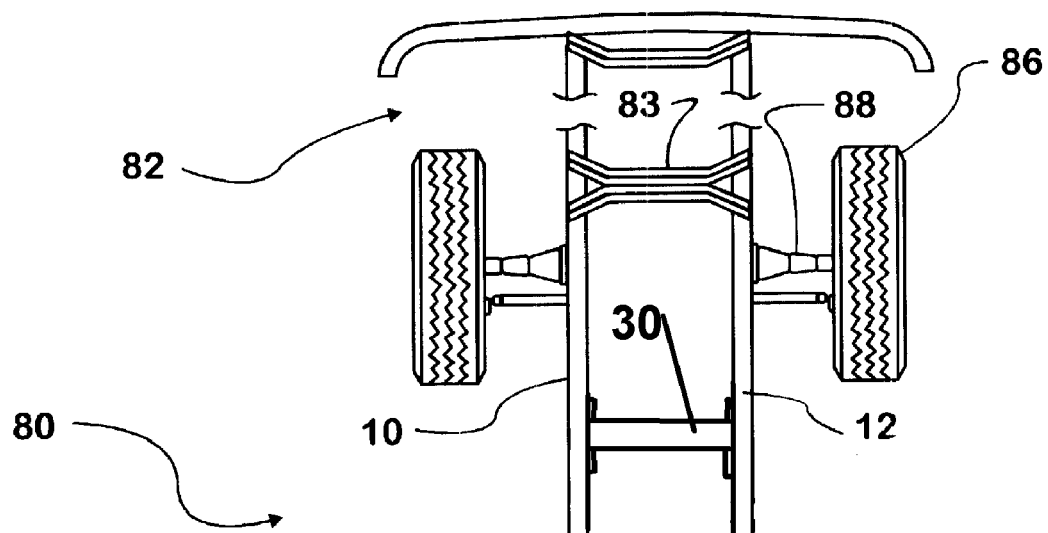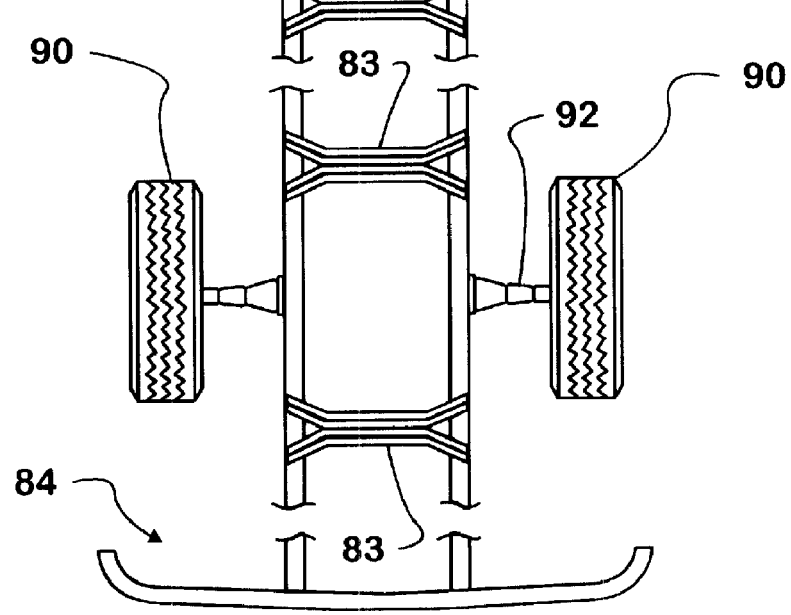
FIG. 2

STRUCTURAL AIR TANK CROSSMEMBER

BACKGROUND OF THE INVENTION

1. Technical Field

The disclosure relates to frames for motor vehicles and in particular to an improved frame incorporating one or more air tanks disposed as structural cross members between long axis frame rails.

2. Description of the Problem

The fundamental structural members in frames for heavy duty motor vehicles, such as trucks, are a pair of elongated, longitudinally-extending main frame rails. The frame rails lie in parallel to the long or longitudinal axis of the vehicle. The two frame rails are spaced from one another and secured to one another using cross members. These cross members are usually, but not always, perpendicular to the frame rails and lie in the plane of the frame rails.

It has been common to hang various components, such as fuel tanks, battery packs and compressed air tanks for heavy duty vehicles from the frame. These components may be bolted to the frame rails or cross members, or supported on subassemblies which in turn are hung from or otherwise supported from the frame. These components and their support arrangements add weight to the vehicle, and in some applications take up valuable space or require compensating actions to off set balance issues raised by the components.

Ramsey, United States Published Patent Application 2005/0062251 recognized that it has been generally desirable to reduce the weight of heavy duty vehicles and to simplify their construction. Ramsey proposed utilizing air tank(s) to double as vehicle frame cross member(s), replacing existing cross members and thereby saving some weight while concurrently simplifying vehicle construction and maintaining, or even increasing, the structural integrity of the frame. Ramsey taught securing air tanks between frame main members and wheel suspension system hangers so that the frame reacts loads imposed on the frame during vehicle operation.

SUMMARY

A motor vehicle is provided with a frame having parallel frame rails and at least one cross member constructed from a tube sealed at its opposite ends by first and second mounting plates. The cross member directly abuts the frame rails along the mounting plates which close the opposite ends of the tube.

Additional effects, features and advantages will be apparent in the written description that follows.

BRIEF DESCRIPTION OF THE DRAWINGS

The contribution to the art believed novel is set forth in the appended claims. The preferred mode of use will best be understood by reference to the following detailed description of an illustrative embodiment when read in conjunction with the accompanying drawings, wherein:

FIG. 2 is a plan view of a vehicle frame incorporating the present invention.

DETAILED DESCRIPTION OF THE INVENTION

Figure 1:
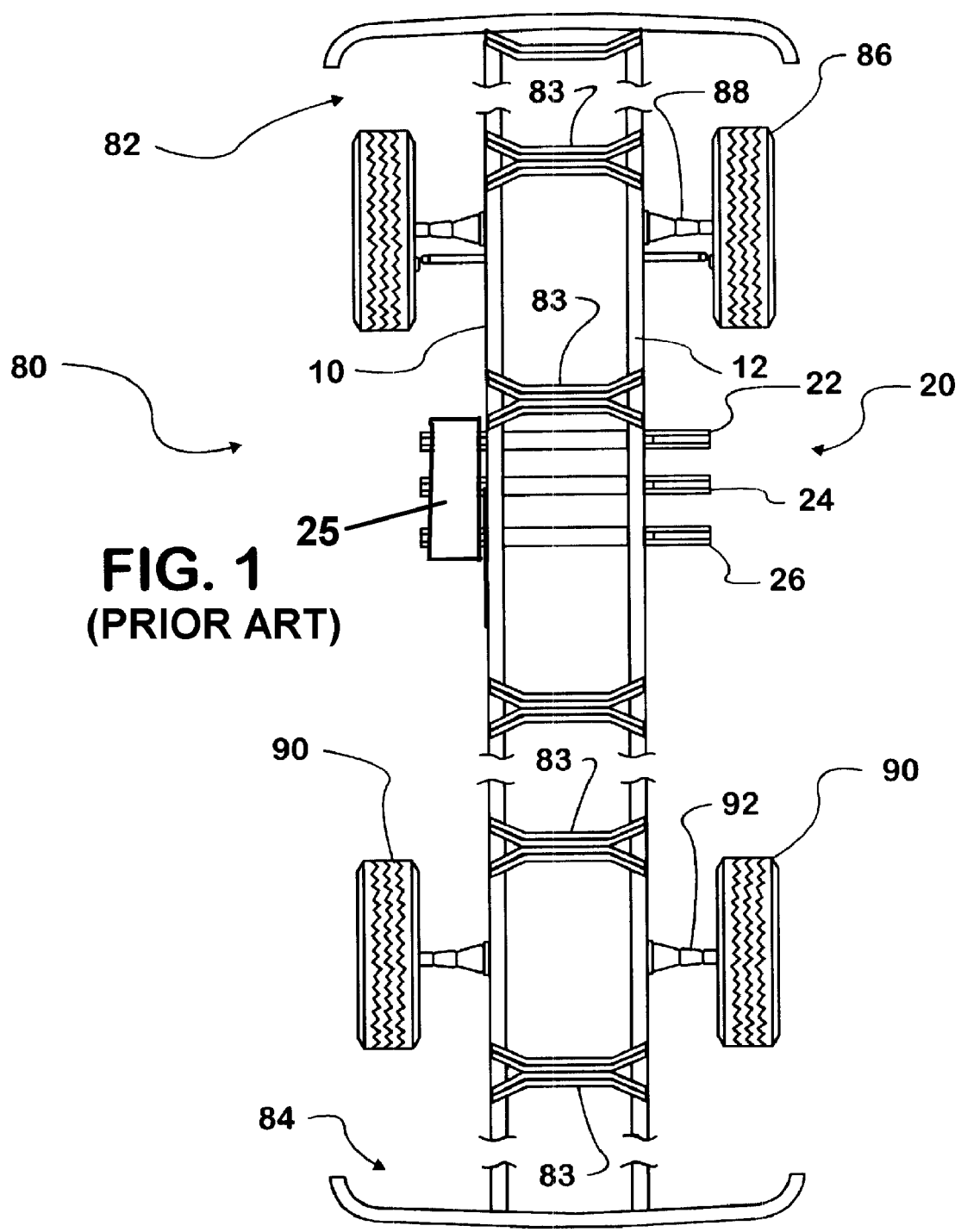
FIG. 1 is a plan view of a vehicle chassis or frame.

Referring now to the drawings and in particular to FIG. 1, a plan view of a vehicle chassis/frame 80 illustrates a conventionally constructed chassis. Chassis 80 comprises a pair of parallel, longitudinally extending frame rails 10 and 12 which extend from the front end 82 of the vehicle to the rear end 84. Frame rails 10 and 12 are connected to one another by a plurality of cross members 83. The cross members 83 are mounted perpendicular to the frame rails in the plane of the frame/chassis 80. Chassis designs employing other configurations for cross members, such as an X-member frame where cross members also cross one another, are known but less usual. Front steerable wheels 86 are carried on a front axle 88 while rear drive wheels 90 are carried on a rear axle 92. An accessory support platform 20 hangs from side rails 10 and 12 between the front axle 88 and rear axle 92. A tank 25 is illustrated supported on the rails 22, 24, 26 along the driver's (left hand) side of the chassis/frame 80. The support rails 22, 24, 26 illustrate a conventional application of supporting an accessory such as a tank from a vehicle frame. The use of such support rails, and alternative techniques for supporting accessories from the frame such as hanger brackets, etc., adds weight to the final vehicle and occupies space.

Accessory support platform 20 comprises three support rails 22, 24 and 26, which are mounted hung from the frame rails 10 and 12. Support rails 22, 24 and 26 are parallel to one another and perpendicular to the frame rails. Support rails 22, 24 and 26 are substantially longer than the spacing between frame rails 10 and 12, with the result that the support rails extend out from the frame rails toward the sides of the vehicle and can be used to provide a substantial area of support between the frame rails and the outside edges of the vehicle.

Referring now to FIG. 2, a combined structural member/air tank 30 has been substituted for one of the cross members 30 between frame rail 10 and frame rail 12. This structural air tank cross member 30 is disposed perpendicular to the frame rails 10 and 12 in the plain of the frame 80 and is mounted directly against the inside faces of the frame rails along its ends.

Figure 3:
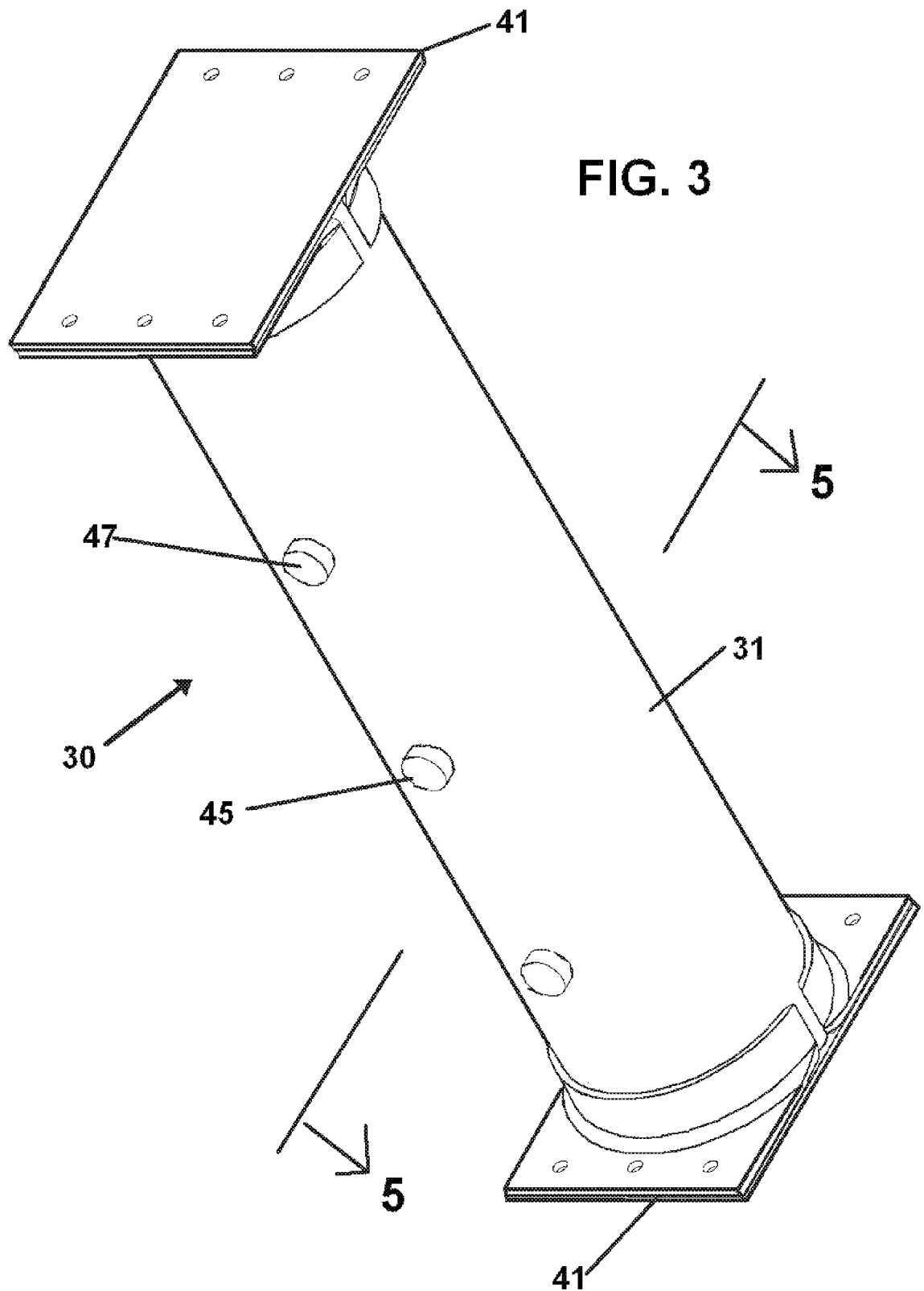
FIG. 3 is a perspective view of an air tank cross member.

Referring to FIG. 3, structural air tank cross member 30 is illustrated in greater detail. Structural air tank cross member 30 combines reinforced flat mounting plates 41, which function both as cross member mounting elements and to close the ends of the cross member 30, with a section 31 of tube/pipe to form a volume 60 (shown in FIG. 5) for the storage of compressed air. Tube section 31 is closed at its opposite ends using the reinforced flat mounting plates 41 to form the tank. Since essentially any thickness of tube may be used for tube section 31, provided it meets the structural requirements of the vehicle, the cross member 30 can be built to meet any strength requirement. Tube section 31 conventionally has a circular cross section for greater strength and reduced material usage for a given volume, but could have other cross sectional shapes including rectangular. Inlet and outlet check valves 45 and 47 provide for the introduction and release of air from air tank cross member 30 as required.

Figure 4:
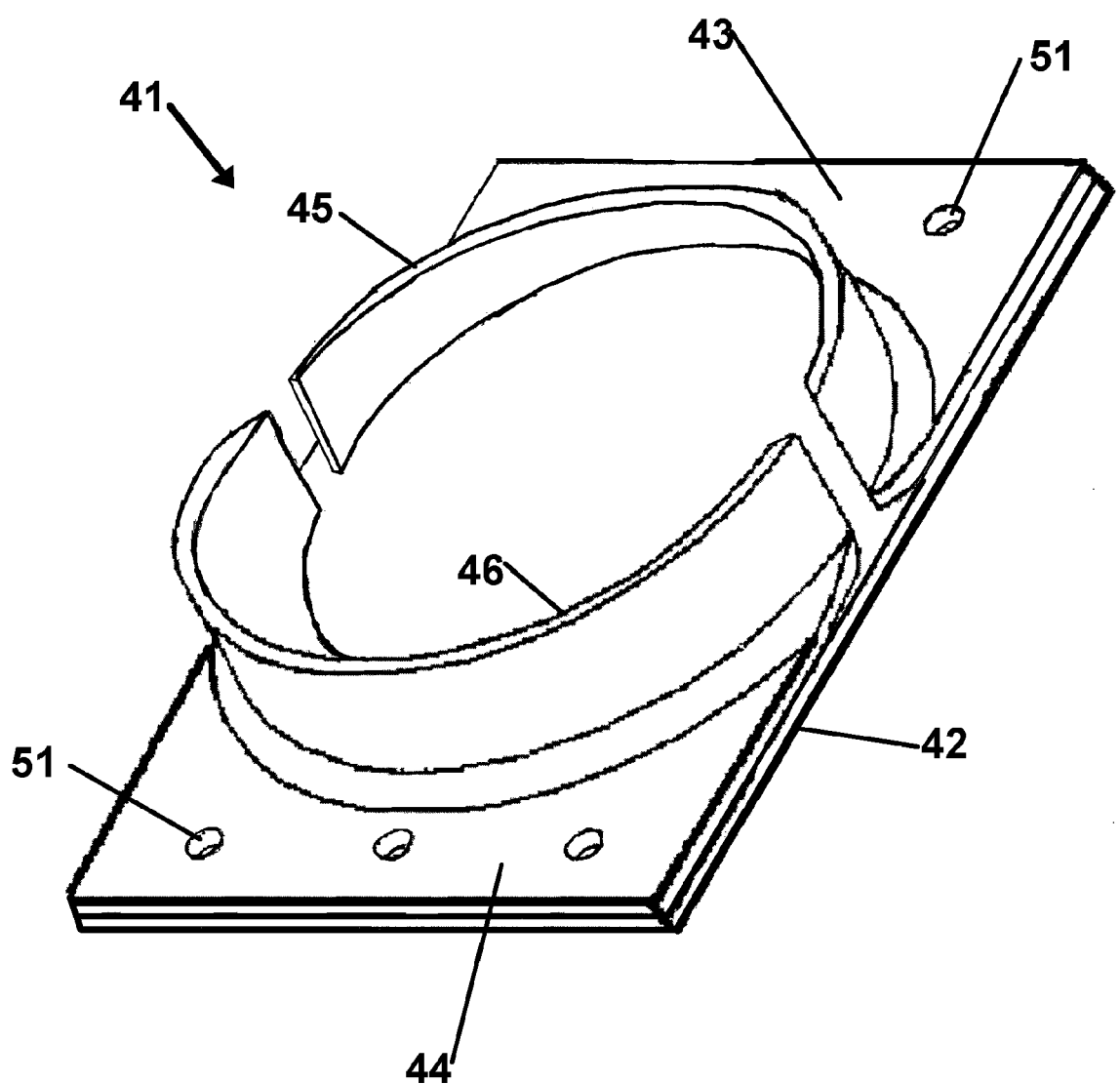
FIG. 4 is a perspective view of end mounting plates for the air tank cross member of FIG. 3.

FIG. 4 shows a reinforced flat mounting plate 41 used to close either end of a tube section 31. Mounting plate 41 comprises three major pieces, a back plate 42 and two front collar plates 43, 44, which incorporate collars 45, 46, respectively. The front collar plates 43, 44 bracket one end of a tube section 31. An open end of a tube section 31 fits against the back plate 42 and may be welded to the back plate to seal the end of the structure and provide the volume for storage for compressed air. Front plates 43 and 44 are mounted with the collars 45, 46 fit snugly around the end of the tube section 31 to seat the tube section and protect the welds. Plates 43 and 44 are welded to back plate 42. Apertures 51 are located through the front plates 44, 43 and the back plate 42 allowing the member to be secured by bolts to a vehicle frame rail.

Figure 5:
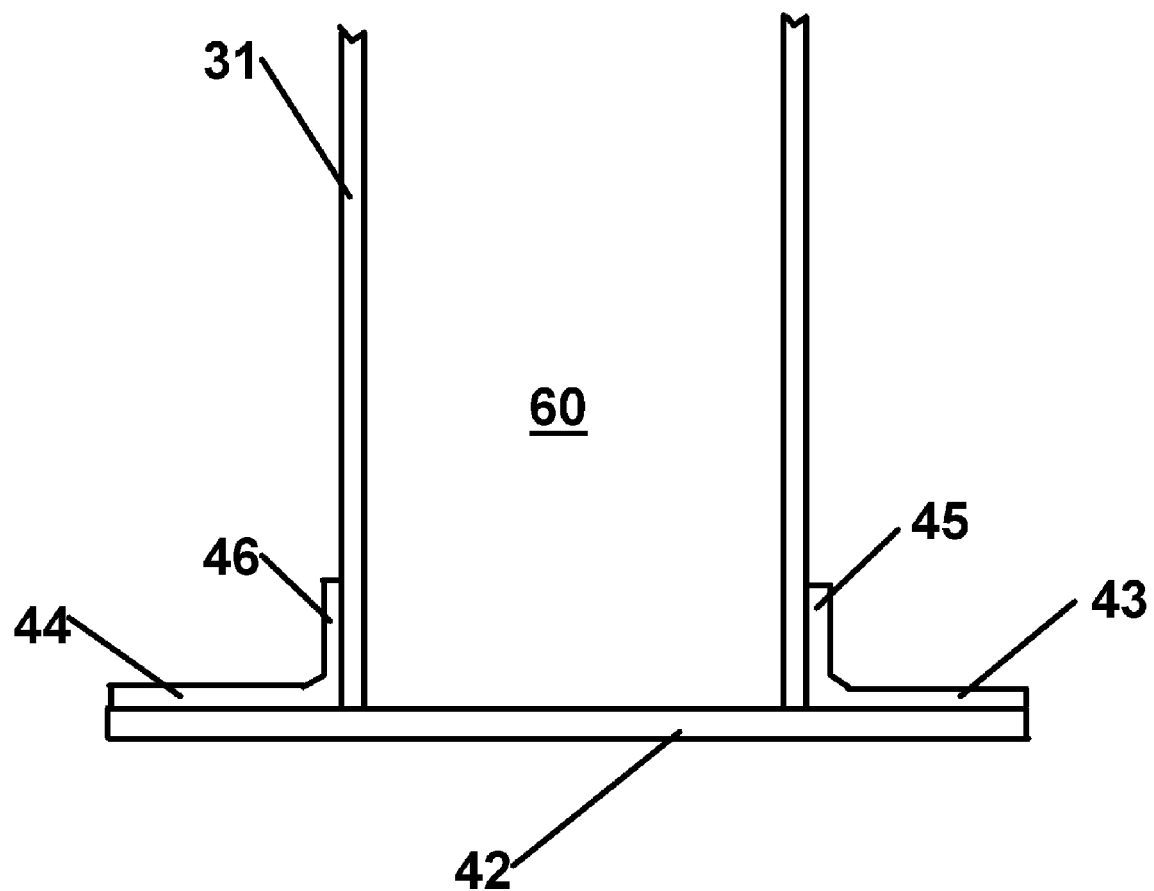
FIG. 5 is a cross sectional view of an air tank cross member taken along section lines 5-5 in FIG. 3.

FIG. 5 is a cross section of one end of member 30, illustrating the juncture of tube 31 with back plate 42, and the use of front plates 43 and 44 to collar an end of the tube. Back plates 42 close the ends of tube 31 complete enclosure of volume 60. Tube 31 may be conventionally attached to the back plate 42 using welding.

Conflating air tank and cross member allows better packaging of multiple air tanks, lower vehicle weight, and eliminates air tank hanger brackets on a bus chassis. The lower cost and weight of vehicles afforded by using the air tanks as the center portion of the cross members allows for better packaging on short wheel base vehicles. The mounting arrangement simplifies the assembly of the vehicle.

While only a preferred embodiment is described here in detail, the claims are not limited thereto, but are intended to extend to various changes and modifications thereof.

What is claimed is:

1. A motor vehicle frame comprising:
   first and second parallel frame rails having inside faces;
   at least a first cross member disposed between and perpendicular to the first and second frame rails; and
   the first cross member constructed from a tube sealed at its opposite ends by first and second mounting plates, the first and second mounting plates each including a back plate having opposite flat faces, with a first flat face applied over the tube and the second flat face abutting the inside face of first or second parallel frame rail for mounting, each mounting plate further comprising a pair of collar plates, the pair of collar plates being attached to an opposite face of the back plate from the face abutting the first or second frame rail and providing a half collar fitted to the outside of the tube.

2. A motor vehicle frame according to claim 1, further comprising apertures through the collar plates and mounting plates to receive bolts for attachment of the plates to a frame rail.

3. A motor vehicle frame according to claim 2 wherein the cross member has a check valve for admission of air.

* * * * *